P. MacGAHAN.
MEASURING INSTRUMENT.
APPLICATION FILED JAN. 25, 1916.

1,258,031. Patented Mar. 5, 1918.

WITNESSES:
Fred H Miller
J H Procter

INVENTOR
Paul MacGahan
BY
Wesley G Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

MEASURING INSTRUMENT.

1,258,031.     Specification of Letters Patent.     Patented Mar. 5, 1918.

Application filed January 25, 1916. Serial No. 74,113.

*To all whom it may concern:*

Be it known that I, PAUL MacGAHAN, a citizen of the United States, and a resident of Pittsburgh, in the county of Allegheny and State of Pennsylvania, have invented a new and useful Improvement in Measuring Instruments, of which the following is a specification.

My invention relates to measuring instruments and particularly to indexes and scales for indicating instruments.

The object of my invention is to provide an index and a scale for an instrument of the above indicated character that may be readily observed over a wide range of operation of the instrument.

Heretofore, the maximum length of a scale for speedometers of the rotating-drum type and other similar measuring devices was limited by the length of a visible arc on the circumference of the rotatable member of the instrument. In order to increase the range of the instrument, it was necessary to adjust its windings or its gear ratio. Since this operation is undesirable, especially when the instrument is to be used in commercial practice where it is desirable to estimate the indications over a wide range without actually reading the scale, I provide a scale plate having a plurality of slits and a scale for each of the slits. The rotatable member of the instrument is provided with a plurality of index bands or zones that are adapted to register with the respective slits. The bands are printed or otherwise marked upon the rotatable member and start from a common longitudinal line, the length of each of the bands being a multiple of the length of the slits. That is to say, one band is equal in length to one of the slits, another band is equal in length to twice the length of one of the slits and another is equal in length to three times the length of one of the slits. The longest band is adapted to coöperate with the scale having the lowest values marked thereon, and, after it is completely visible through its corresponding slit, the next band coöperates with the slit and scale having the next highest markings. In this manner, each of the scales may be used in succession to indicate between predetermined values, and an accurate estimation of the indications may be obtained without the necessity of actually reading the scales.

Figure 1:
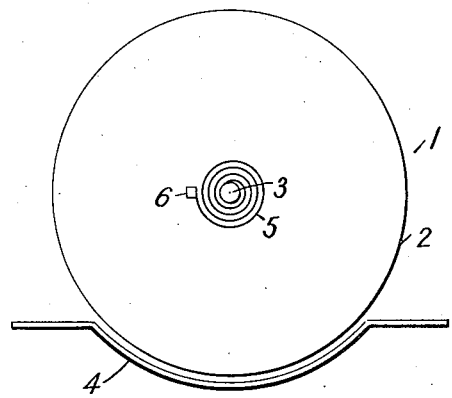
Figure 2:
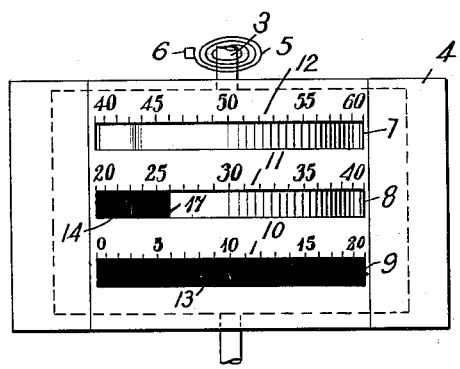
Figure 3:
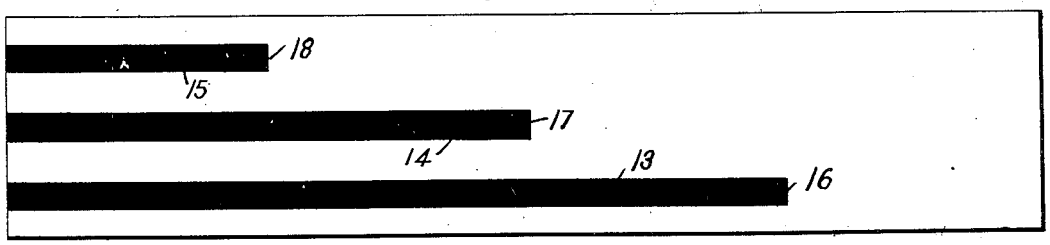

Figure 1 of the accompanying drawings is a top plan view of parts of a measuring instrument embodying my invention, Fig. 2 is a front elevational view of the instrument shown in Fig. 1, and Fig. 3 is a development of the rotatable member embodied in the instrument shown in Figs. 1 and 2.

A measuring instrument 1 comprises a cylindrical rotatable member 2 that is mounted upon a shaft 3 and is adapted to coöperate with a scale plate 4 to indicate the relative positions of the shaft 3 or some measured quantity which is proportional to the position of the shaft. One end of a spring 5 is attached to the shaft 3, and its other end is connected to a stationary member 6. The spring 5 is provided for opposing the movement of the shaft 3 that receives its turning moment from an actuating device (not shown) such as an electrical measuring instrument, a speedometer or any other similar device.

The scale plate 4 is so shaped that it has the same curvature as the visible portion of the rotatable member 2, and it is provided with three slits 7, 8 and 9. Scales 10, 11 and 12 are provided for the respective slits, and their markings are of equal divisions. The divisions of the scale 10 are marked with the figures zero to 20, the divisions of the scale 11 are marked with the figures 20 to 40 and the divisions of the scale 12 are marked with the figures 40 to 60. Thus, if an indicator is provided that will successively coöperate with the scales 10, 11 and 12 accurate indications, or an estimation of the indications, may be obtained from zero to 60. This was not possible in instruments heretofore constructed having a single scale unless the instrument was readjusted or its calibration was changed, under predetermined conditions.

The rotatable member 2 is provided with three index bands or zones 13, 14 and 15 that start from a single longitudinal line. The band 15 is equal in length to the arc of the scale 12, the band 14 is equal in length to twice the arc of the scale 11 and the band 13 equal in length to three times the arc of the scale 10. The bands 13, 14 and 15 are adapted to register with the openings 9, 8 and 7, respectively, under predetermined conditions.

If the spring 5 is of such dimensions that, when no turning moment is imparted to the shaft 3, the outer end 16 of the band 13 stands adjacent to the zero mark on the scale 10, when a turning moment is imparted to the shaft 3, the end 16 of the band 13 will coöperate with the scale 10 to indicate, by casual observation, the value of the turning moment. When the end 16 of the band 13 reaches the right-hand end of the slit 9, the end 17 of the band 14 registers with the mark 20 on the scale 11, and a further movement of the shaft 3 causes the end 17 to coöperate with the scale 11 until it reaches the end of the slit 8. When this occurs, the end 18 of the band 15 registers with the mark 40 on the scale 12. Thus, the bands 13, 14 and 15 coöperate in succession with the scales 10, 11 and 12, respectively, to indicate the turning moment of the shaft 3.

I do not limit my invention to any particular type of actuating device, nor do I limit it to the illustrated form of markings, because it is adaptable to various modifications without departing from the spirit and scope of the invention as set forth in the appended claims.

I claim as my invention:

1. A measuring instrument comprising a casing having a plurality of scales thereon, and a movable member having indexes marked thereon corresponding to the scales, one of said indexes being the same length as its scale and another being two times as long as its scale.

2. A measuring instrument comprising a casing having a plurality of parallel scales thereon, and a drum having indexes corresponding to the scales and differing in length inversely with reference to the valuations of the scales with which they coöperate.

3. A measuring instrument comprising a casing having a plurality of substantially horizontal parallel scales marked thereon and a rotatable cylindrical member having indexes marked thereon for the respective scales that extend different distances from a single longitudinal line on the cylindrical member.

4. An indicating instrument comprising a stationary member having a plurality of parallel slits provided with scales, and a movable member having indexes disposed adjacent to the respective slits and of uniformly differing lengths.

5. A measuring instrument comprising a stationary member having a plurality of slits and corresponding scales and a rotatable cylindrical member having a plurality of index bands extending circumferentially unequal distances from a single longitudinal line on the cylindrical member.

6. A measuring instrument comprising a stationary member having a plurality of horizontal slits and corresponding scales and a rotatable cylindrical member having a plurality of index bands marked thereon of different lengths, the length of the shortest band being the same as that of the corresponding slit and the lengths of the others being multiples thereof.

7. A measuring instrument comprising a stationary member having a plurality of horizontal slits and corresponding scales of uniform length and a rotatable cylindrical member having index bands marked thereon the lengths of which are multiples of the length of the slits.

8. A measuring instrument comprising a stationary member having three parallel slits and corresponding scale markings, and a rotatable cylindrical member having three index bands, one of said index bands being the same length as its slit, the second being twice as long as its slit and the third being three times as long as its slit.

9. A measuring instrument comprising a stationary member having three parallel slits with scale markings therefor, and a rotatable cylindrical member having three index bands, one of said index bands being the same length as its slit, the second being twice as long as its slit and the third being three times as long as its slit.

In testimony whereof, I have hereunto subscribed my name this 4th day of Jan. 1916.

PAUL MacGAHAN.